May 4, 1943.    A. C. RUGE    2,318,102
ROSETTE TYPE STRAIN GAUGE
Filed Sept. 15, 1941
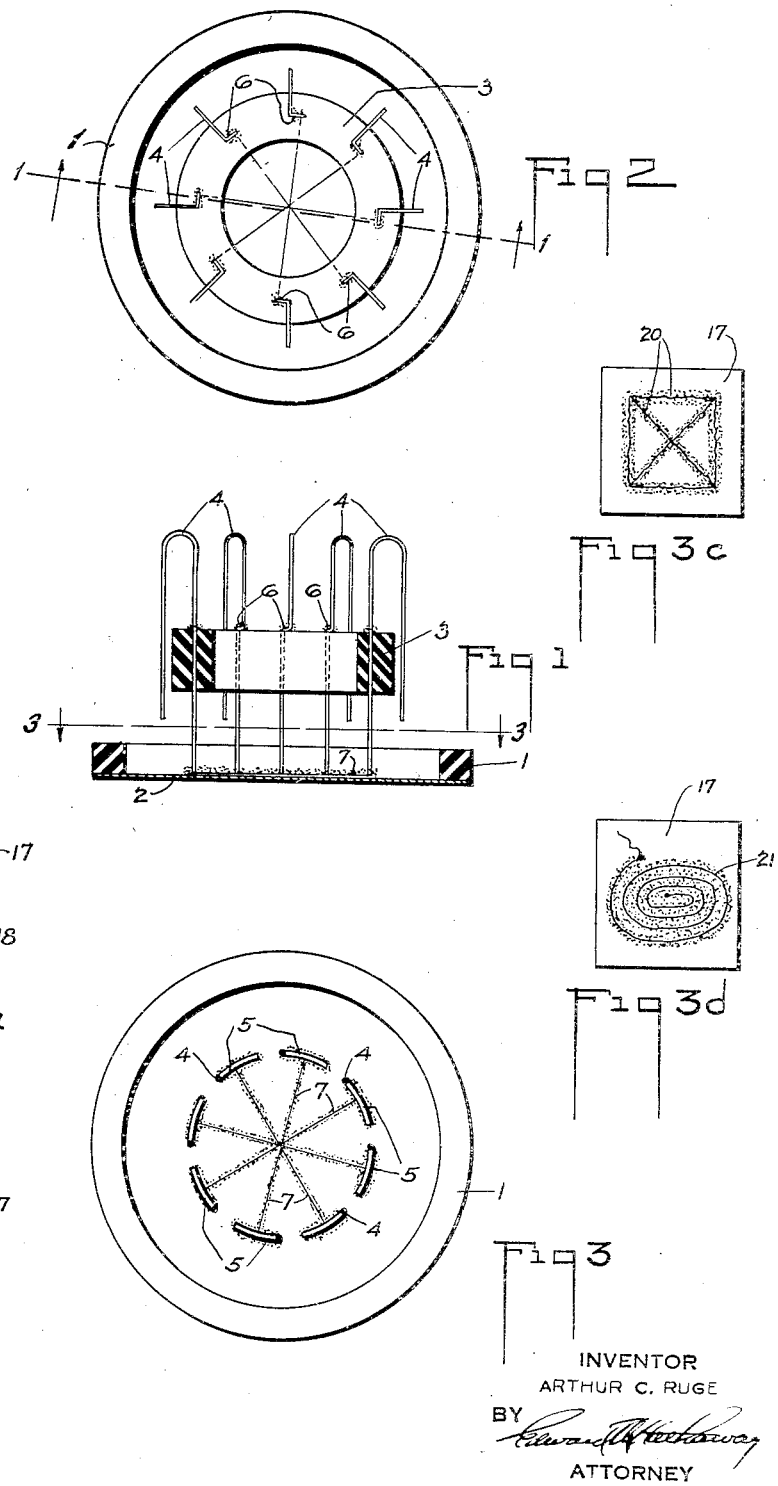
INVENTOR
ARTHUR C. RUGE
BY
ATTORNEY Patented May 4, 1943

2,318,102

UNITED STATES PATENT OFFICE 2,318,102

ROSETTE TYPE STRAIN GAUGE

Arthur C. Ruge, Cambridge, Mass.

Application September 15, 1941, Serial No. 410,865

6 Claims. (Cl. 201—63)

This invention relates generally to electrical strain sensitive gauges of the type employing a resistance element whose resistance varies in proportion to the strain thereof and relates more particularly to an improved gauge for measuring strain in different directions, this application being a continuation-in-part of my copending application Serial No. 295,207, filed September 16, 1939.

One object of my invention is to provide an improved unitary means whereby electrical strain sensitive filaments extending in different directions are adapted to be bonded throughout their effective length in a simple, direct and compact manner to the surface of a member subject to strain.

Gauges of the type disclosed herein are referred to as rosette strain gauges and it is a further object of my invention to provide improved means for commonly supporting the filaments extending in different directions whereby all of the filaments may be effectively bonded to a member by a simple application of a bonding material such as Duco household cement, de Kotinsky cement or other suitable bonding material.

A more specific object is to provide an improved rosette strain gauge in which the filaments are supported in a rugged framework while still permitting the extremely fine wire filaments to be applied in close juxtaposition throughout their effective length to the surface of a member.

A still further specific object is to provide an improved rosette strain gauge of the electrical strain sensitive type that is compact, rugged, relatively inexpensive in its manufacture, is easily applied and which has a high degree of accuracy and sensitivity.

Other objects and advantages will be more apparent to those skilled in the art from the following description of the accompanying drawing in which:

Fig. 1 is a vertical section through my improved specific form of the rosette strain gauge taken substantially on the line 1—1 of Fig. 2;

Fig. 2 is a plan view of the gauge;

Fig. 3 is a horizontal sectional view taken substantially on the line 3—3 of Fig. 1; and Figs. 3a, 3b, 3c and 3d illustrate various arrangements of the strain sensitive filaments for measuring various kinds of strain.

As shown in Fig. 1, the preferred form of rosette comprises a lower annular frame member 1 adapted to support a stretched insulating membrane 2 such as a thin piece of paper or other suitable insulating sheet material which is bonded to the lower surface of ring 1. If it is desired to have membrane 2 taut, it may be slightly moistened with water or other material and allowed to dry thereby shrinking to tighten the paper which, of course, has been bonded to the ring but prior to the shrinking. On the other hand, the membrane may be just bonded directly to ring 1 without wetting the membrane to obtain any special tautness. This will allow a slightly greater degree of flexibility than if the membrane is taut, thereby permitting the membrane to conform more readily to any irregularities in the surface of the member to be tested.

An upper ring 3 of somewhat smaller diameter than the lower ring 1 and formed of any suitable insulating material has a series of relatively heavy conductor leads 4 extending through the ring and terminating in right angle bends or feet 5, all lying in a common plane. The leads 4 may be, if desired, more firmly held to ring 3 by having a slightly bent portion 6 overlying the top of ring 3. The leads are cemented to the ring 3 and the bent portion 6 provides a strong point of bond between the conductor and ring 3. After the leads 4 and ring 3 are assembled in the manner above described filaments 7 are connected to the feet 5, these filaments in the form shown in Figs. 1 to 3 criss-crossing in spider-like form as shown in Fig. 3, the ends of any one filament being connected to leads at diametrically opposite points. If desired, the filaments may be electrically connected at the point of criss-crossing or may be insulated from each other, but in any event the filaments and feet 5 are placed in diaphragm 2 substantially centrally thereof and entirely bonded thereto by any suitable cement such as Duco household cement, de Kotinsky cement, Glyptal or the like.

The rings 1 and 3 may be formed of any suitable material. For instance, ring 1 may be formed of white Lucite or other suitable insulating material while ring 3 may be formed of Bakelite or black compressed fibre, rubber or other suitable insulating material. The leads 4 are preferably formed of relatively heavy wire, for example, one sixty-fourth of an inch in diameter, while the filaments are extremely fine metallic wire of from one to three or four thousandths of an inch in diameter. Because of the leads being relatively heavy they form a relatively rigid support between the upper ring and membrane 2 thereby making the entire rosette gauge a very strong and yet compact device which is adapted to be firmly pressed in position on a surface of a member with little or no possibility of misalignment or distortion of the parts. The lower ring 1 being of larger diameter than the upper ring 3 it is possible for an operator during a cementing operation to place his fingers directly on ring 1 and firmly hold the same until the cement has dried.

It will, of course, be understood that the bottom side of membrane 2 is cemented to the member thereby permitting the membrane to serve as insulation between the test member and the strain sensitive filament 7. Any usual Wheatstone bridge circuit or other electrical measuring or indicating means may be connected to any two diametrically opposed leads 4 to determine the strain in that diametric direction. Such instruments and circuits are more fully disclosed in my said copending application and inasmuch as the same do not constitute a part of my present invention they are omitted for purposes of clarity. If it is desired, readings may be taken simultaneously or from two or all of the filaments merely by connecting the leads of the respective filaments. Under certain conditions it may be desirable to omit ring 1 and membrane 2 in which case the rosette gauge would consist of ring 3 and a series of relatively heavy leads 4, the filament 7 then being connected diametrically to the opposite feet 5. The gauge can now be cemented to the test surface by first coating the same with one of the cements herein referred to and then placing the filaments in the cement. The filaments may be previously covered with insulating enamel or cement so as to insure adequate insulation from the test surface. It will, of course, be understood that the conductors 4 may be made as heavy as necessary in order to adequately maintain the filaments and feet 5 in their desired spaced relation when not in use. However, it is seen that by using ring 1 and membrane 2 an extremely high degree of ruggedness is obtained for the entire structure. In fact the ruggedness of the entire unit is such that several rosette strain gauges may be loosely carried in a common container without fear of damage. The filaments may be formed of any of the materials set forth in my said copending application. The filament 7 in Fig. 1 is shown for purposes of clarity slightly spaced from the upper surface of membrane 2, although it will be understood that in actual practice the filament is laid directly on the paper and cemented thereto. The filament may extend tautly between the feet 5 or may lie with a slight waviness, all in accordance with the theory set forth in my said copending application. The filament is made of extremely fine wires generally about $1/1000$ of an inch diameter, although filaments have been used as fine as $1/4000$ of an inch diameter and larger than $3/1000$ of an inch diameter, but these of course are not absolute limits. The ability of the cement to bond the fine wire filaments is readily appreciated by the fact that for a 1" length of filament whose diameter is approximately $3/1000$ of an inch the available bonding surface of the filament is at least approximately 1300 times its cross-sectional area. The fine filament wires when placed upon a paper-like membrane produce a gauge whose thickness is only a few thousandths of an inch thereby causing all of the filaments to have an extremely close relation to the surface of a member under test and insuring that a given strain can be transmitted substantially uniformly through the bonding cement to any filament regardless of whether the filaments cross each other in a star formation as shown in Fig. 3a or are arranged separately as shown in Fig. 3b. It is thus possible to bring the filaments within a given localized area which, if desired, may be of a diameter no greater than the length of the filament, and moreover, the localized nature of the several filaments permits them to be simultaneously bonded to the localized area so that the direction of stress may be effectively studied within such area. Certain examples of filament materials among others that may be used are "Advance" which is a copper-nickel alloy having generally 45% nickel and 55% copper; "Nichrome" which is a nickel chromium composition containing approximately 60% nickel, 15% chromium and 25% iron; and "Iso-elastic" which has the same general composition as Nichrome. Advance is one of the more desirable materials, although the other materials mentioned, as well as other kinds of materials may be employed, once their relation of change of resistance to change of strain is determined, normally called the strain sensitive factor.

The principles of my invention readily lend it to the formation of a self-contained unit that may be readily attached to the surface of a specimen or other member to be tested. This self-contained unit is accomplished by cementing a strain-sensitive filament on to a slab or strip 17, Figs. 3a–d, of non-conducting material such as paper, cardboard, Bakelite, Celluloid, glass, etc. so as to form therewith a unit which, in turn, may be applied by cementing the non-conducting material to the surface of the specimen for determining the strain and/or stress thereof. The non-conducting material constitutes a supporting or carrying means for the filament which may take various forms. For instance, in Fig. 3a the filaments 18 are in a rosette formation so that the strains in several directions are measurable. The filaments 18 can be electrically connected at their center or may be insulated from each other, depending upon the degree of resistance desired. In Fig. 3b the filaments 19 are arranged in a triangular form, while in Fig. 3c the filaments 20 are arranged in a square whose corners are diagonally connected. The filaments can be electrically connected at their points of juncture or they may be insulated from each other, again depending upon the degree of electrical resistance desired, or depending upon the character of stress and/or strain which it is desired to study. In Fig. 3d the filament 21 may be in the form of an elongated coil which would be suitable for a dummy gauge, that is, a gauge which is not bonded to a test member but constitutes one arm of a Wheatstone bridge so as to be responsive only to temperature changes thereby nullifying any temperature effects on a bonded strain measuring gauge that forms another one of the bridge arms. The arrangement of employing a thin paper or the like as a carrying medium 17 is not only extremely inexpensive for a scientific instrument of precision qualities, but also the extremely fine filaments permit the whole unit to have a high degree of flexibility which is helpful in cementing the unit to a flat, curved or angular surface of a specimen or live member.

It will of course be understood that various changes in details of construction and arrangement of parts may be made by those skilled in the art without departing from the spirit of the invention as set forth in the appended claims.

I claim:

1. A strain gauge comprising a frame member, a plurality of leads supported by said frame in a circularly spaced manner and extending in a common direction, a plurality of continuous solid filaments whose electrical resistance varies in accordance with the strain thereof and said filaments respectively extending between and connected to certain pairs of said leads at their corresponding ends, a membrane to which said filaments are cemented throughout their effective length, and a second frame member secured to said membrane.

2. A strain gauge comprising a frame, a plurality of leads supported by said frame and extending therefrom in the same direction, said leads terminating in right angled feet at their lower ends, a continuous solid filament whose electrical resistance varies in accordance with the strain thereof, said filament extending between and connected to said feet, a membrane, means for bonding said feet and said filament throughout its effective length to said membrane, and a second frame member secured to said membrane and encircling said filament and leads at their lower ends.

3. A strain gauge for determining strain in a plurality of predetermined directions in a localized area on a member subject to a variable strain, comprising a common flexible membrane, a plurality of continuous solid fine wire filaments respectively extending substantially in straight lines in said predetermined directions and being of extensible and contractible electrical conducting material whose electrical resistance varies in accordance with said extension and contraction only in the direction of the filament axes, and means for bonding said filaments throughout their effective lengths to said common membrane within an area corresponding to said localized area whereby said membrane and filaments form a self-contained unitary device adapted to have its said localized area entirely bonded to said member so as to cause all filaments to be bonded simultaneously throughout their said effective lengths to said member and thereby cause deformations of the body to be transmitted through the bonding cement to the respective filaments in accordance with the magnitude and direction of the deformation of said body.

4. A strain gauge for determining strain in a plurality of predetermined directions in a localized area on a member subject to a variable strain, comprising a common flexible membrane, a plurality of continuous solid fine wire filaments being of extensible and contractible electrical conducting material whose electrical resistance varies in accordance with said extension and contraction only in the direction of the filament axes, means for bonding all of the filaments throughout their effective lengths to said common membrane within an area corresponding to said localized area, said membrane and filaments thereby forming a self-contained unitary device adapted to be entirely bonded over said localized area to said member so as to cause all filaments to be bonded simultaneously throughout their effective lengths to said member and thereby cause deformation of the body to be transmitted through the bonding cement to the respective filaments in accordance with the magnitude and direction of the deformation of said body.

5. The combination set forth in claim 4 further characterized in that said filaments are of such size that for a one inch length of filament the surface area thereof is at least 1300 times its cross-sectional area and the membrane is of paper-like thinness whereby the total thickness of the unitary device comprising the membrane, filaments and bonding material is only a few thousandths of an inch thick.

6. The combination set forth in claim 3 further characterized in that said filaments cross each other in a star formation.

ARTHUR C. RUGE.